US008484474B2

(12) United States Patent
Batke et al.

(10) Patent No.: US 8,484,474 B2
(45) Date of Patent: Jul. 9, 2013

(54) METHODS FOR FIRMWARE SIGNATURE

(75) Inventors: Brian A. Batke, Novelty, OH (US); Jack M. Visoky, Lyndhurst, OH (US); James J. Kay, Chardon, OH (US); Scott A. Mintz, Solon, OH (US); William B. Cook, Northfield, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 212 days.

(21) Appl. No.: 12/829,261

(22) Filed: Jul. 1, 2010

(65) Prior Publication Data

US 2012/0005480 A1    Jan. 5, 2012

(51) Int. Cl.
*H04L 9/32*  (2006.01)
(52) U.S. Cl.
USPC .......................................... 713/175; 713/156
(58) Field of Classification Search
USPC ......................................................... 713/175
See application file for complete search history.

(56) References Cited

U.S. PATENT DOCUMENTS

| 7,055,148 B2* | 5/2006 | Marsh et al. ................... 717/172 |
| 2004/0025010 A1* | 2/2004 | Azema et al. ................. 713/156 |
| 2004/0025036 A1* | 2/2004 | Balard et al. ................. 713/189 |
| 2008/0263679 A1 | 10/2008 | Ho et al. |

FOREIGN PATENT DOCUMENTS

| EP | 1429224 A1 | 6/2004 |
| EP | 1881465 A2 | 1/2008 |
| WO | 9933221 A1 | 7/1999 |
| WO | 2004075505 A1 | 9/2004 |

OTHER PUBLICATIONS

European Search Report dated Dec. 6, 2011 for EP Application No. 11172090.0-2212, 8 pages.

* cited by examiner

*Primary Examiner* — Fikremariam A Yalew
(74) *Attorney, Agent, or Firm* — R. Scott Speroff; Turocy & Watson, LLP; John M. Miller

(57) ABSTRACT

A method for installing embedded firmware is provided. The method includes generating one or more firmware file instances and generating one or more digital certificate instances that are separate instances from the firmware file instances. The method includes associating the one or more digital certificate instances with the one or more firmware file instances to facilitate updating signature-unaware modules with signature-aware firmware or to facilitate updating signature-aware modules with signature-unaware firmware.

12 Claims, 8 Drawing Sheets

METHODS FOR FIRMWARE SIGNATURE

TECHNICAL FIELD

The claimed subject matter relates generally to industrial control systems and more particularly to systems and methods that facilitate secure updates of embedded firmware by isolating cryptographic information from binary instances of the firmware.

BACKGROUND

Modern electronic devices often employ embedded firmware that may periodically need updated as features are enhanced or device problems corrected. Examples of such devices include consumer products such as MP3 players as well as industrial control devices such as programmable automation controllers. When updating firmware in a device, it is important to verify that the firmware is valid for the device and has been created by the manufacturer (e.g., it is not rogue or counterfeit firmware). Also, the respective firmware should be verified so as not to have been tampered with or corrupted. This is particularly important for industrial control systems, where use of invalid, corrupted or otherwise compromised firmware can result in denial of service to the application or at worst unpredictable or dangerous operation. For instance, an attacker could modify a firmware image such that it would render a device unusable, or could modify a firmware image by injecting malicious code that could cause the device to operate in an unsafe manner.

One method to facilitate secure operations of firmware is to employ public and private keys for cryptography. The distinguishing technique used in public key cryptography is the use of asymmetric key algorithms, where the key used to encrypt a message is not the same as the key used to decrypt the respective message. Each user has a pair of cryptographic keys—a public key and a private key. The private key is kept secret, while the public key may be widely distributed. Messages are encrypted with the recipient's public key and can only be decrypted with the corresponding private key. Digital signatures are a message signed with a sender's private key and can be verified by anyone who has access to the sender's public key.

In relation to industrial control systems, a problem arises when trying to determine how to update firmware on differing classes of devices in a secure manner (e.g., older versus newer devices having differing firmware capabilities). Some devices have been in operation for years and may have no knowledge regarding how to process the above-described encryption techniques including public keys and signatures. For instance, with existing firmware—that which is already released for existing devices may not be signature aware. Thus, a problem exists on how existing modules can be updated with signed, signature-aware firmware in a secure manner. If a trouble-shooting scenario exists where a user needs to revert to older firmware, another problem arises in how a module can be "securely" downgraded to unsigned firmware. Still yet other problems include how can existing unsigned firmware be verified for integrity and how can signature-aware production firmware accept a debug or development build that is unsigned. To date, simple checksum procedures have typically been employed for security but there is a need for a more secure mechanism such as public and private key exchanges. Clearly, there is a need for encryption techniques to be applied to electronic firmware update procedures in industrial control systems yet to date, no methods have been developed to address the problem of backwards compatibility with modules that may not have the underlying software capabilities to process advanced encryption technologies.

SUMMARY

The following summary presents a simplified overview to provide a basic understanding of certain aspects described herein. This summary is not an extensive overview nor is it intended to identify critical elements or delineate the scope of the aspects described herein. The sole purpose of this summary is to present some features in a simplified form as a prelude to a more detailed description presented later.

Systems and methods are provided to facilitate secure updating of industrial control system hardware and components while providing a path for upgrading and/or downgrading module firmware that may not be compatible with the most current security procedures. This includes generating firmware binaries that are separate from the underlying digital certificates that are employed during download of the respective binaries. Firmware that employs multiple images or components can utilize certificates for each component, where certificates include a list of hardware revisions for which the firmware is valid. Existing, signature-unaware firmware can be updated with signature-aware firmware by sending the new firmware binary without the certificate. Signature-aware firmware can be updated with unsigned firmware as needed, e.g., for debug/development by sending the binary without the certificate (e.g., subject to certain constraints such as requiring local access to the module). Certificates can be created for previously-released, unsigned firmware, without modifying the existing firmware, where software tools can then verify the integrity of the firmware using the certificate. In previous methods, there was no separation between certificate and binary, where digital certificates were a created as a portion of the binary file that operated the respective modules. For new modules, this technique would provide a secure update procedure yet older modules would have no manner in which to process new security procedures during download so the only option would be to replace such modules before downloading which would be cost prohibitive.

To the accomplishment of the foregoing and related ends, the following description and annexed drawings set forth in detail certain illustrative aspects. These aspects are indicative of but a few of the various ways in which the principles described herein may be employed. Other advantages and novel features may become apparent from the following detailed description when considered in conjunction with the drawings.

DETAILED DESCRIPTION

Methods are provided for utilizing digital signatures in accordance with industrial control system firmware downloads. In one aspect, a method for installing embedded firmware is provided. The method includes generating one or more firmware file instances and generating one or more digital certificate instances that are separate instances from the firmware file instances. The method includes associating the one or more digital certificate instances with the one or more firmware file instances to facilitate updating signature-unaware modules with signature-aware firmware or to facilitate updating signature-aware modules with signature-unaware firmware.

Figure 1:
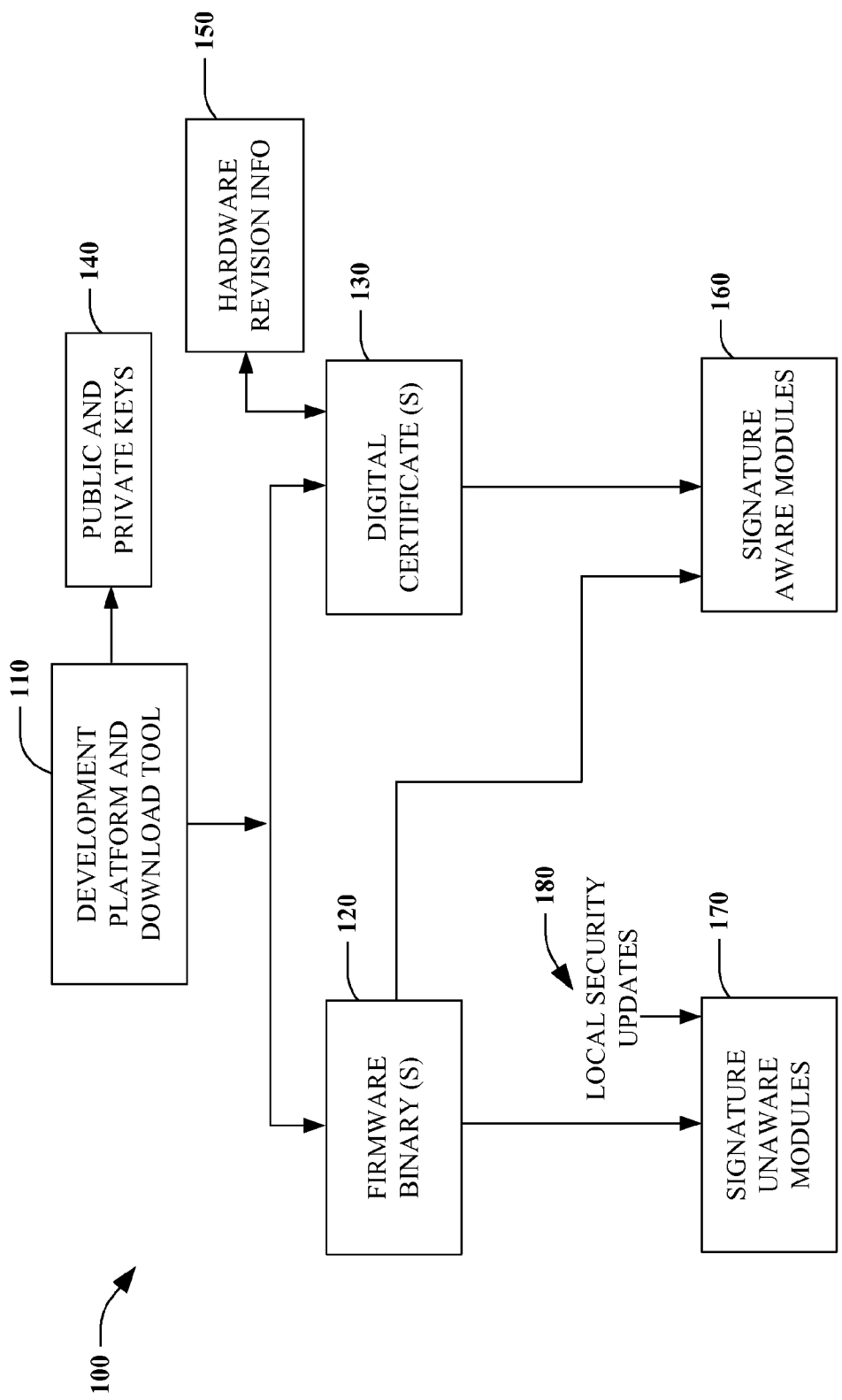
FIG. 1 is a schematic block diagram illustrating a system for generating firmware signatures in an industrial control process.

Referring initially to FIG. 1, a system 100 is illustrated for generating firmware signatures in an industrial control process. The system 100 includes a development platform and download tool 110 (also referred to as platform) that generates one or more firmware binary files 120 and one or more digital certificates 130 that are separate instances from the binary files yet associated with the respective binaries for later secure downloading. The firmware binaries 120 (e.g., boot code, runtime code, file system code, web pages, applets, configuration, user programs, and so forth) can be for substantially any type of component that can be found in an industrial environment including controllers, servers, clients, input/output modules, communications modules, and other electronic devices capable of having firmware that is downloadable across a network. The platform generates one or more public and private keys 140 in addition to the digital certificates. As shown, hardware revision information 150 can be encoded into the certificates 130 as will be described in more detail below.

For modules that have been developed under signature processing principles—referred to as signature-aware modules 160, firmware binaries 120 along with separate instances of digital certificates 130 can be loaded on the modules in a secure manner. For older modules—referred to as signature-unaware modules 170, the firmware binaries can be directly loaded without the corresponding digital certificates which can be loaded via a local update procedure or tool at 180. For example, feedback mechanisms (e.g., I/O inputs) can be detected to ensure a user has physical access to a given industrial component before allowing update of the firmware binary and validating against a locally generated certificate. After updates have occurred locally, remote procedures can occur in the future as the module will now have signature-aware capability. General purpose firmware update tools can be employed that process the certificate like other firmware binaries, thus the tool needs no particular knowledge of how to process the certificate.

In general, the system 100 enables secure updating of industrial control system hardware and components while providing a path for upgrading and/or downgrading module firmware that may not be compatible with the most current security procedures. This includes generating firmware binaries 120 that are separate from the underlying digital certificates 130 that are employed during download of the respective binaries. Firmware that employs multiple binary instances 120 can utilize at least one digital certificate 130 for each instance, where certificates include a list of hardware revisions 150 for which the firmware is valid. Existing, signature-unaware firmware can be updated with signature-aware firmware by sending the new firmware binary without the certificate at 170. Signature-aware firmware can be updated with unsigned firmware as needed, e.g., for debug/development by sending the binary without the certificate (e.g., subject to certain constraints such as requiring local access to the module). Certificates 130 can be created for previously-released, unsigned firmware, without modifying the existing firmware, where software tools at 180 can then verify the integrity of the firmware using the certificate. In previous methods, there was no separation between certificate and binary, where digital certificates 130 were created as a portion of the binary file that operated the respective modules. For new modules, this technique would provide a secure update procedure yet older modules would have no manner in which to process new security procedures during download so one option would be to replace such modules before downloading which would be cost prohibitive. Another option would be to build an additional (unsigned) firmware binary whose purpose is to update an older module to be signature aware. It may be more desirable to create one version of the firmware then have the certificate be separate.

As noted, the system 100 allows multiple binaries 120 and a corresponding certificate 130 for each binary. For example, one certificate for boot code, one certificate for runtime code, one certificate for file system. This method can also be extended to other updatable entities such as user programs, for example. The system can include use of a secure boot-load mechanism that allows secure downgrading to older signature-unaware firmware. In another example, a device partitions firmware into "boot code" and "application code," where boot code is signature-aware. Application code may be signature aware (new code), or unaware (existing code). When the device starts, the boot code verifies the signature of the application code (boot code should be able to access the signature of the application code). If valid, the application code can then run. Downgrading to signature unaware application code involves calculating a signature for the old application code and storing it such that the boot code can access it and then updating the device with the old application code. In this manner, the boot code can determine that the old application code was in fact produced by the manufacturer and has not been corrupted.

In an alternative aspect, when the system 100 is implemented in a controller for example, the public key can be stored outside of the firmware image (outside of the boot and outside of the runtime). As can be appreciated, every module does not have to store the key in this manner, and this is not an essential part of the mechanism, but is another enhancement/option for some modules. This has the benefit of allowing developers to change the public key independent of the firmware if needed. For example, one key can be employed for development builds and another for when the firmware is publicly released. Should the private key ever be compromised or lost, developers could update the public the key on a module and still be able to use the old firmware, because the key as stored in the module would be decoupled from the actual firmware itself.

In another aspect, the system supports a method for installing embedded firmware. This includes generating one or more firmware file instances and generating one or more digital certificate instances that are separate instances from the firmware file instances. This also includes associating the one or more digital certificate instances with the one or more firmware file instances to facilitate updating signature-unaware modules with signature-aware firmware or to facilitate updating signature-aware modules with signature-unaware firmware. The method includes loading the digital certificate instances from a tool that processes the digital certificate instances in the same manner as the firmware file instances (e.g., the tool process the digital certificates as merely another binary instance).

The method includes employing a secure boot load tool to allow signature unaware firmware to be securely loaded. This includes employing feedback mechanisms to ensure that a user has physical access to a module in order to update signature unaware firmware. This can also include loading signature-aware modules with unsigned firmware in order to facilitate debug of the modules while also employing feedback mechanisms to ensure that a user has physical access to a module in order to update signature unsigned firmware. The method includes associating separate certificates with multiple binaries in order to sign different portions of firmware, where the certificate includes a component to identify one or more hardware revisions supported by signed firmware. The method also includes creating a certificate for unmodified firmware and verifying firmware integrity via an update tool and running older versions of firmware through a signing utility and verifying at least one signature against a binary before loading. This may also include employing a proxy module to run the signing utility or verify the at least one signature. The proxy module would intercept requests to update firmware in a signature-unaware target module, and would verify the certificate against the firmware to be loaded on the target module. If the certificate and firmware are valid, the proxy would then pass the firmware (but not certificate) to the target module.

It is noted that components associated with the industrial control system 100 can include various computer or network components such as servers, clients, controllers, industrial controllers, programmable logic controllers (PLCs), energy monitors, batch controllers or servers, distributed control systems (DCS), communications modules, mobile computers, wireless components, control components and so forth that are capable of interacting across a network. Similarly, the term controller or PLC as used herein can include functionality that can be shared across multiple components, systems, or networks. For example, one or more controllers can communicate and cooperate with various network devices across the network. This can include substantially any type of control, communications module, computer, I/O device, sensors, Human Machine Interface (HMI) that communicate via the network that includes control, automation, or public networks. The controller can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet/IP, DH/DH+, Remote I/O, Fieldbus, Modbus, Profibus, wireless networks, serial protocols, and so forth. In addition, the network devices can include various possibilities (hardware or software components). These include components such as switches with virtual local area network (VLAN) capability, LANs, WANs, proxies, gateways, routers, firewalls, virtual private network (VPN) devices, servers, clients, computers, configuration tools, monitoring tools, or other devices.

Figure 2:
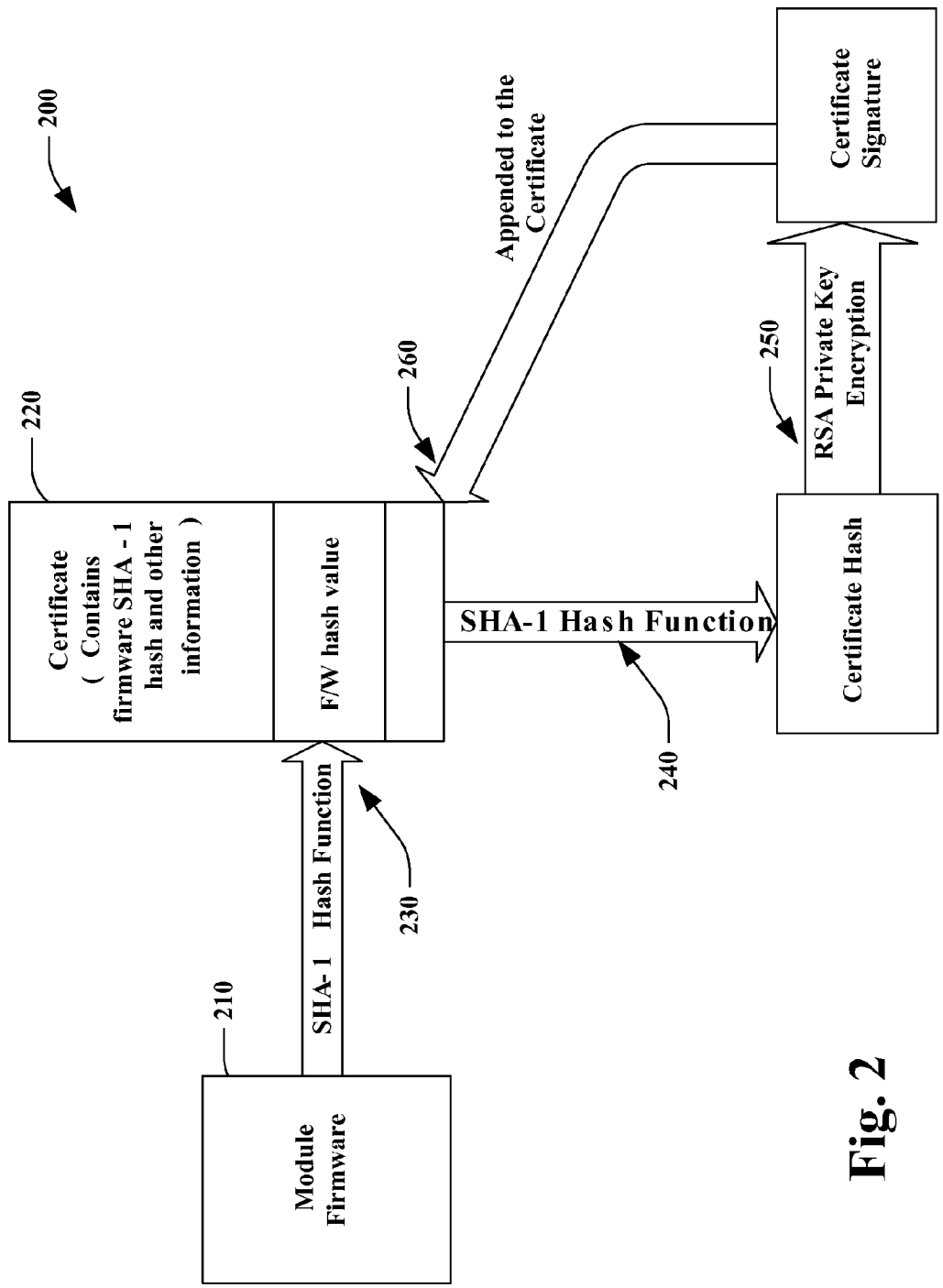
FIG. 2 is a block diagram that illustrates an example firmware signature process.

Turning now to FIG. 2, a block diagram illustrates an example firmware signature process 200. At 210, a normal binary file is created. At 220, a digital certificate is generated that contains information relating to the firmware 210. At 230, a hash value is generated for the firmware image of 210. At 240, a hash value is determined and created for the certificate generated at 220. At 250, the hash values are encrypted with a private key to create a signature. At 260, signatures are appended to the certificate 220, where the certificates are now considered signed.

In general, the firmware signature mechanism as illustrated in the process 200 can be summarized as follows:

A public/private key pair can be generated using secure means or components. The private key is used in creating the digital signature. The public key is used by modules in decrypting the signature.

As part of the build procedure, the firmware image is run through an e.g., SHA-1, SHA-2, MD5, and so forth algorithm to generate a hash value.

The build procedure creates a certificate that includes:

The hash value for the firmware image

Information to identify the module type or hardware revision for which the firmware was built A digital signature, which is the hash value of the certificate itself, encrypted with the RSA algorithm using the private key At firmware update time, the module receives the certificate containing the firmware's hash value and the certificate digital signature. The module computes the hash value of the certificate, decrypts the signature, and compares the hash values. If the hash values match, then the certificate is valid. If not, the update is rejected.

After receiving the entire firmware image, the module computes the hash value of the firmware and compares it to the value from the certificate. If the values don't match, the firmware update is rejected.

Figure 3:
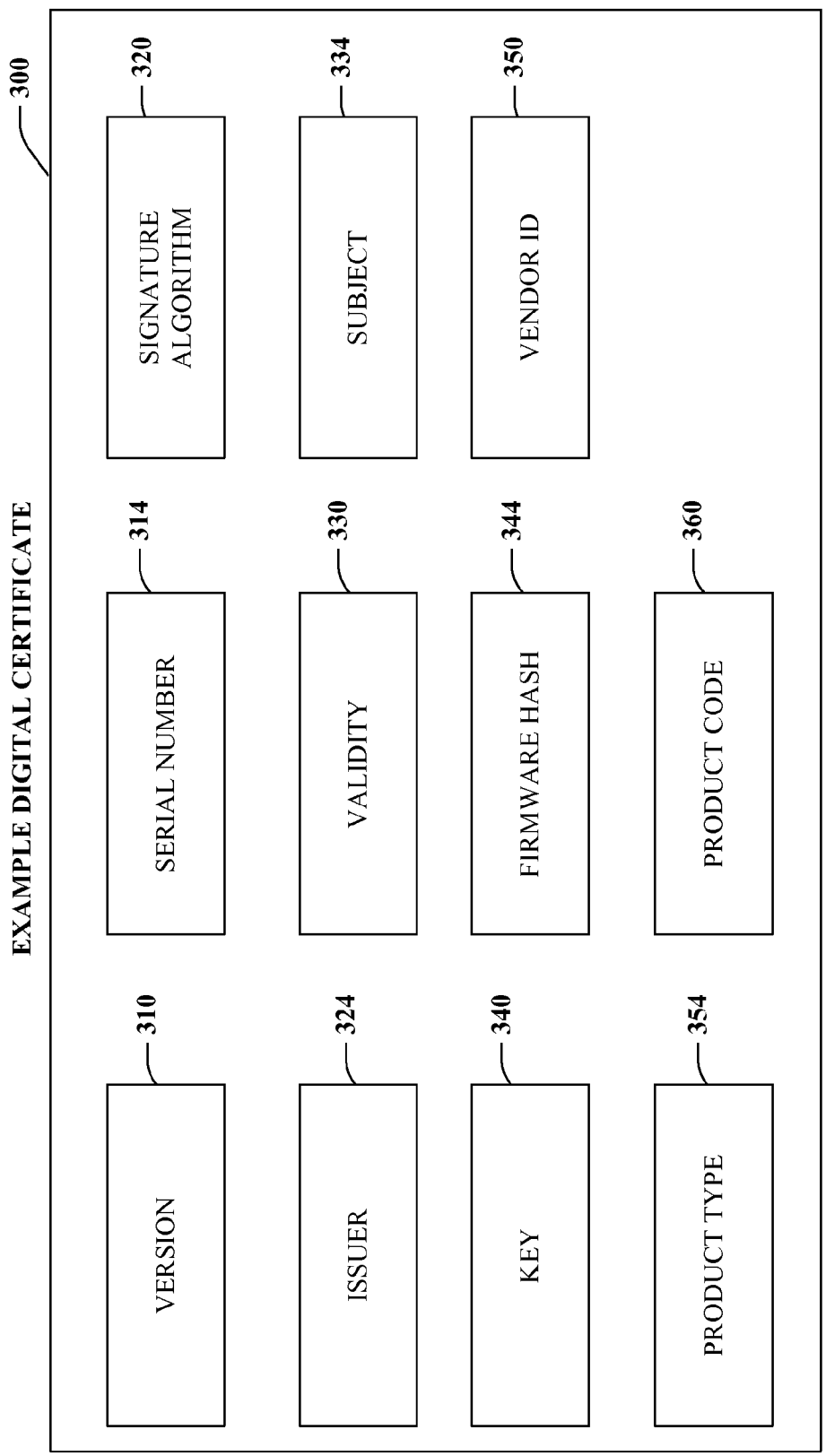
FIG. 3 is a block diagram of an example digital certificate.

FIG. 3 illustrates an example digital certificate 300. Before proceeding, it is noted that the certificate 300 and the examples that are described herein are merely illustrative in nature and that it is to be appreciated that more or less fields may be provided in accordance with the claimed subject matter. As shown, the certificate 300 may include a version field 310, a serial number field 314, a signature algorithm identifier 320, an issuer field 324, a validity field 330, a subject field 334, a key field 340, a hash field 344, a vendor ID 350, a product type 354, or a product code 360, for example.

In general, the certificate 310 can be formatted according to the X.509 standard for PKI certificates, for example. The certificate can be formatted in the DER format of the ASN.1 standard, for example. This is a widely used and accepted format for storing and transmitting certificates. Example certificates include:

The distinguished name field will be used to store the module information, such as module name, family name, and vendor name. These fields are to be present, yet some may be ignored by the particular module if the field is not applicable.

The public key section includes the module's public key. Note however that the target module should already have knowledge of the public key built into its firmware, so the public key in the certificate will be ignored by the module.

Custom extensions are defined to hold the hash value of the associated firmware, as well as the vendor ID, product code, product type, firmware revision, and hardware revision. These fields are generally considered mandatory. Despite these custom insertions/deletions, these certificates still conform to the rules of the certificate.

The certificate structure (in plain text) is for example:

```
                        Certificate:
Data:
   Version: 3
   Serial Number: <Serial Number>
   Signature Algorithm: SHA1WithRSAEncryption
   Issuer: = Company Name
   Validity
      Not Before: <Date of Creation>
      Not After: <Date of Creation +100 years>
   Subject: CN=<Module Name>, OU=<Module Family>, O=<Vendor>
   Subject Public Key Info:
      Public Key Algorithm: RSAEncryption
      RSA Public Key: (VALUE IGNORED)
         Modulus (1024 bit): <module public key modulus>
         Exponent: <module public key exponent>
   X509v3 extensions:
      Firmware Hash: <Hash Value>
         Vendor Id: <Vendor Id>
         Product Type: <Product Type>
         Product Code: <Product Code>
         Firmware Major Rev: <Firmware Major Rev>
         Firmware Minor Rev: <Firmware Minor Rev>
         Hardware Rev String: <Hardware Rev Bitstring>
   Signature Algorithm: SHA1WithRSAEncryption
         <Digital Signature Value>
```

Figure 4:
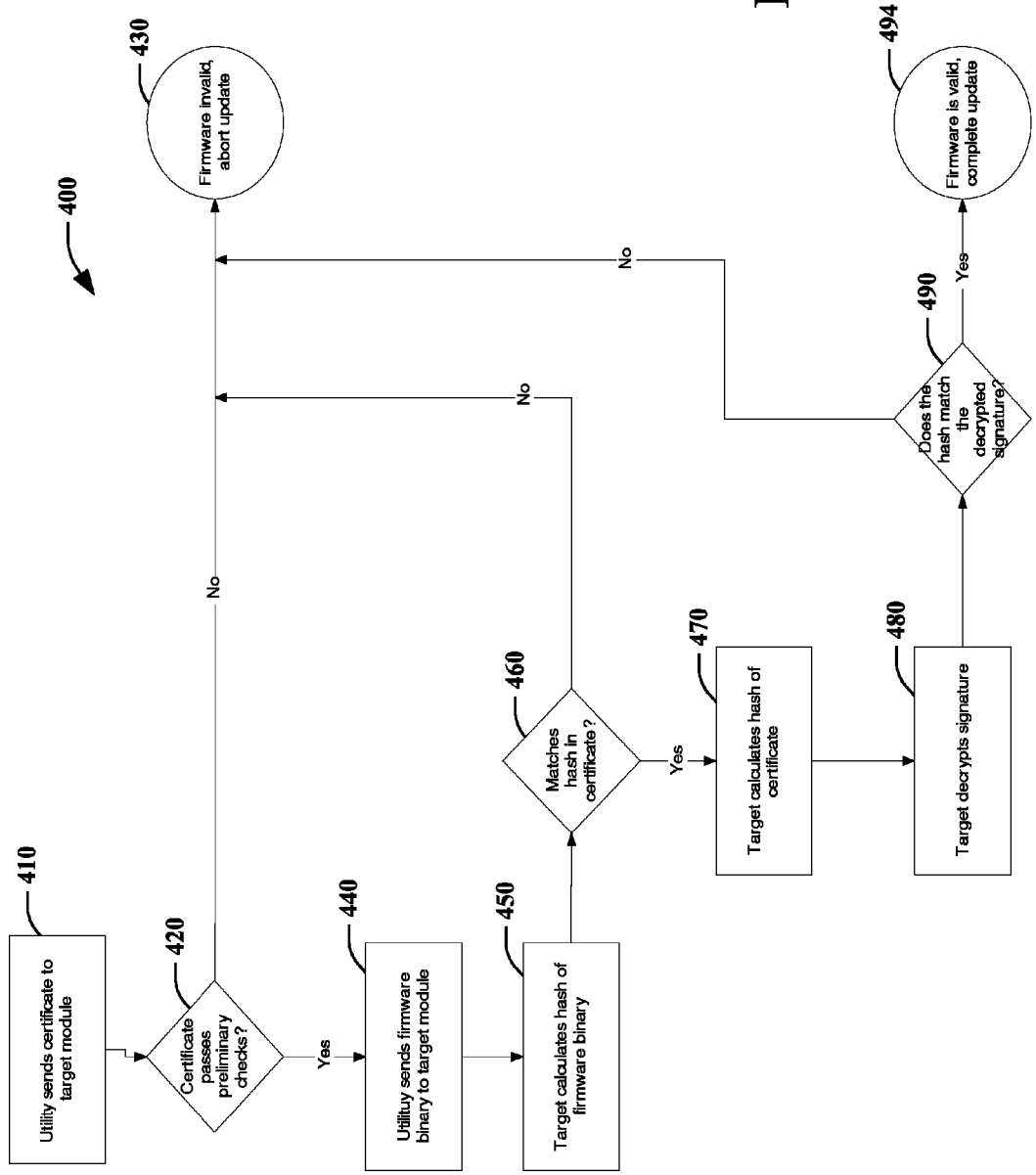
FIG. 4 is a flow diagram illustrating an example firmware signature process.

FIG. 4 is a flow diagram illustrating an example firmware signature process 400. While, for purposes of simplicity of explanation, the methodology is shown and described as a series of acts, it is to be understood and appreciated that the methodologies are not limited by the order of acts, as some acts may occur in different orders or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 410 of FIG. 4, a firmware update utility (or utility) sends a certificate to a target module. At 420, a determination is made as to whether the certificate passes preliminary checks such as verifying that the certificate is appropriate for the type of module being updated. The vendor id 350, product type 354 and product code 360 can be verified at this point. If a problem is detected, the process proceeds to 430 where the update procedure is aborted. If the checks pass at 420, the process proceeds to 440 and sends the firmware binary corresponding to the certificate instance to the target module. At 450, the target calculates a hash of the firmware binary. At 460, a determination is made as to whether the binary hash matches the hash values computed in the certificate. If not, the process ends at 430. If the hash check matches at 460, the process proceeds to 470, where the target calculates a hash for the certificate. At 480, the target decrypts the signature using the target's stored key. At 490, a determination is made as to whether or not the hash value matches the decrypted signature. If not, the process ends at 430. If the hash matches the signature at 490, the firmware is declared valid and the firmware update is completed at 494.

Figure 5:
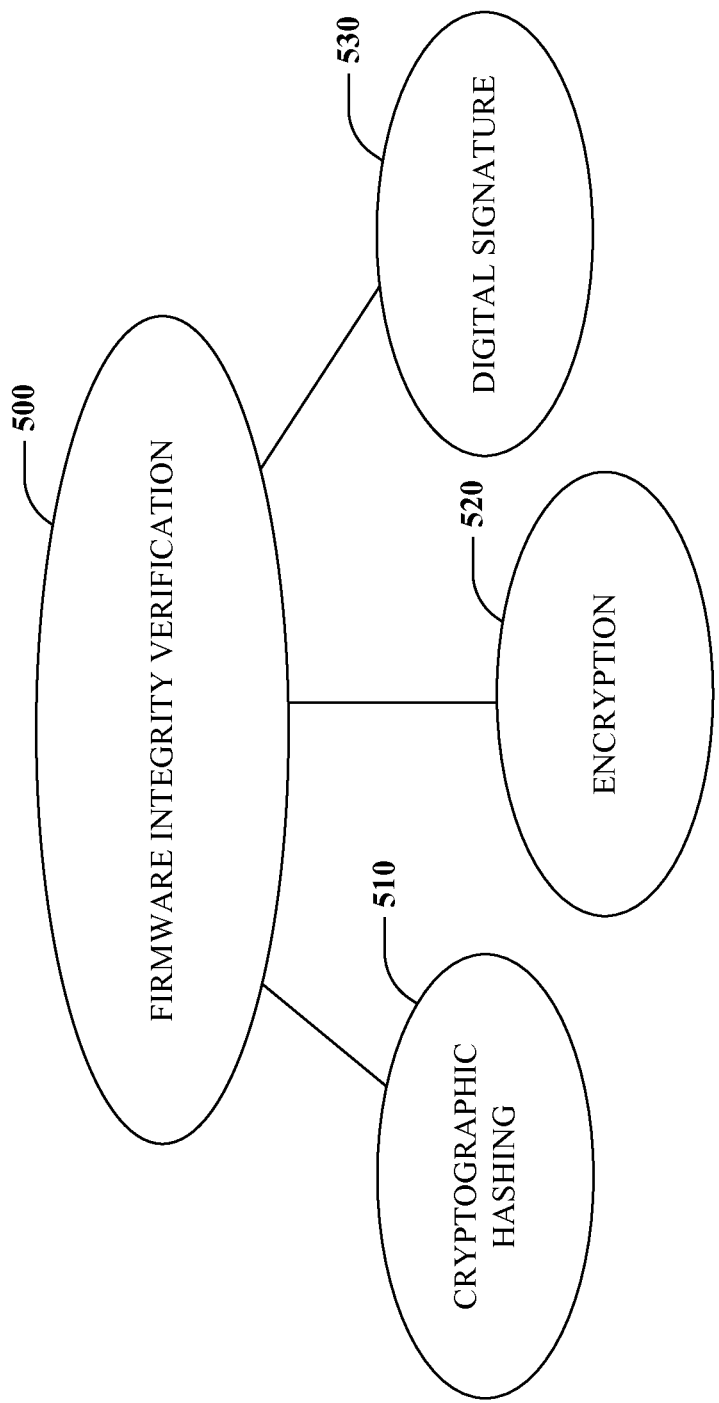
FIG. 5 is a diagram illustrating an example firmware integrity component.

Referring to FIG. 5, an example firmware integrity component 500 is provided. At 510 cryptographic hashing is provided. Generally, a cryptographic hash function is a one-way mathematical function that takes a block of data as input and produces a fixed size string of bytes as output. The output of a hash function is sometimes called a "message digest", a "hash value", a "checksum", or just a "hash". Examples of hash functions are MD5 and SHA-1 or SHA-2, for example.

A suitable hash function will produce a relatively unique hash value from which it is infeasible to determine the original message. The hash value is a fixed length, which is often (but not necessarily) shorter than the original piece of data. As a result, a hash value is in general not unique to a given message, since the set of possible messages is often far larger than the set of possible hashes. Two pieces of data which are different yet yield the same hash are referred to as a collision in the hash function. The more difficult collisions are to generate, the stronger the hash function is (collisions would only be generated by brute force with an ideal hash function).

At 520, encryption refers to a process of scrambling data in such a way that only someone knowing secret information (e.g., a "key") can obtain the original data. In public key encryption, keys exist in pairs. The public key is published and known to the public, whereas the private key is kept secret and only known to those claiming a particular identity. A message encoded with one of the keys can only be decoded with the corresponding key. For example, if a private key is used to encrypt a piece of data, then only the corresponding public key can be used to decrypt that data. RSA is an example of a public key encryption algorithm but other algorithms are possible.

At 530, a digital signature is an application of cryptography to ensure that a message (or document) has been sent by the identified sender. A digital signature typically involves the sender encrypting a hash of the message with the sender's private key. The receiver then decrypts the signature with the sender's public key. If the signature can successfully be decrypted (i.e., if the decrypted hash value matches the message hash value), then the receiver can be sure that the sender is the author of the message. An example of a standard digital signature system is the Digital Signature Standard (DSS).

Figure 6:
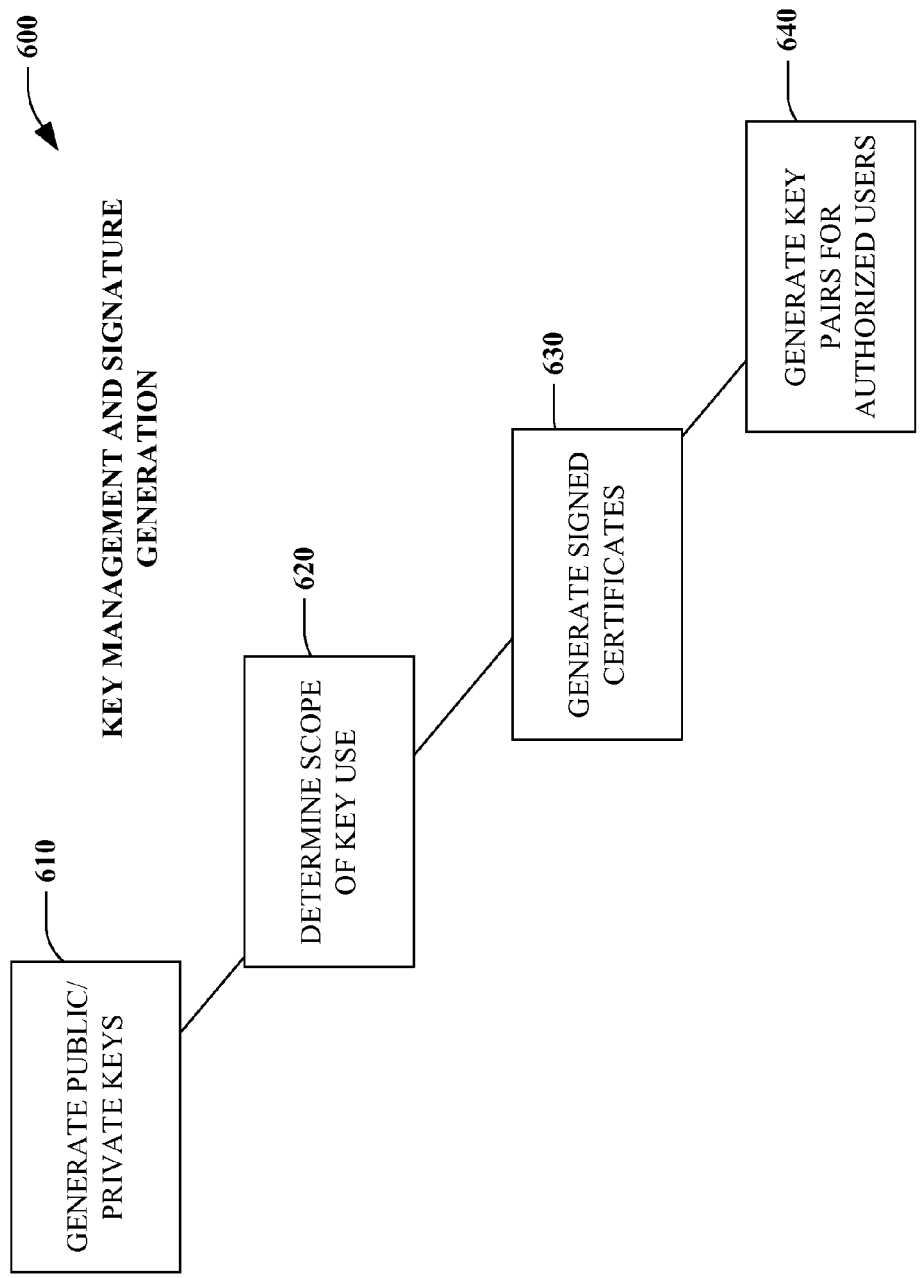
FIG. 6 illustrates an example key management and signature generation process.

FIG. 6 illustrates an example key management and signature generation process. Proper key management and support for signature generation is essential to ensure the robustness of the firmware integrity mechanism. The general requirements for key management and signature generation are listed below:

At 610, a mechanism for public/private key generation is provided. In order to support digitally signed firmware, a mechanism is needed to generate public/private key pairs, and then manage restricted access to the private keys. In order to maintain the integrity of the signature, private keys should be accessible only by a very small number of authorized users. At 620, a determination of whether there is a single public/private key pair for all, or per family of module is considered. At 630, as part of the firmware build process, a mechanism is employed for generating a signed certificate using the appropriate private key. Access to the signing mechanism should be restricted to authorized users, and also create an audit log. This is to prevent unauthorized creation of signed fraudulent or unauthorized firmware that could then be distributed outside of a desired domain. At 640, an alternative solution would be a software package that is able to generate key pairs for authorized users, and then produces signed certificates for a given key pair and certificate content. It is expected that the infrastructure for generating key pairs and signed certificates will be shared across operating units of a business for example.

Figure 7:
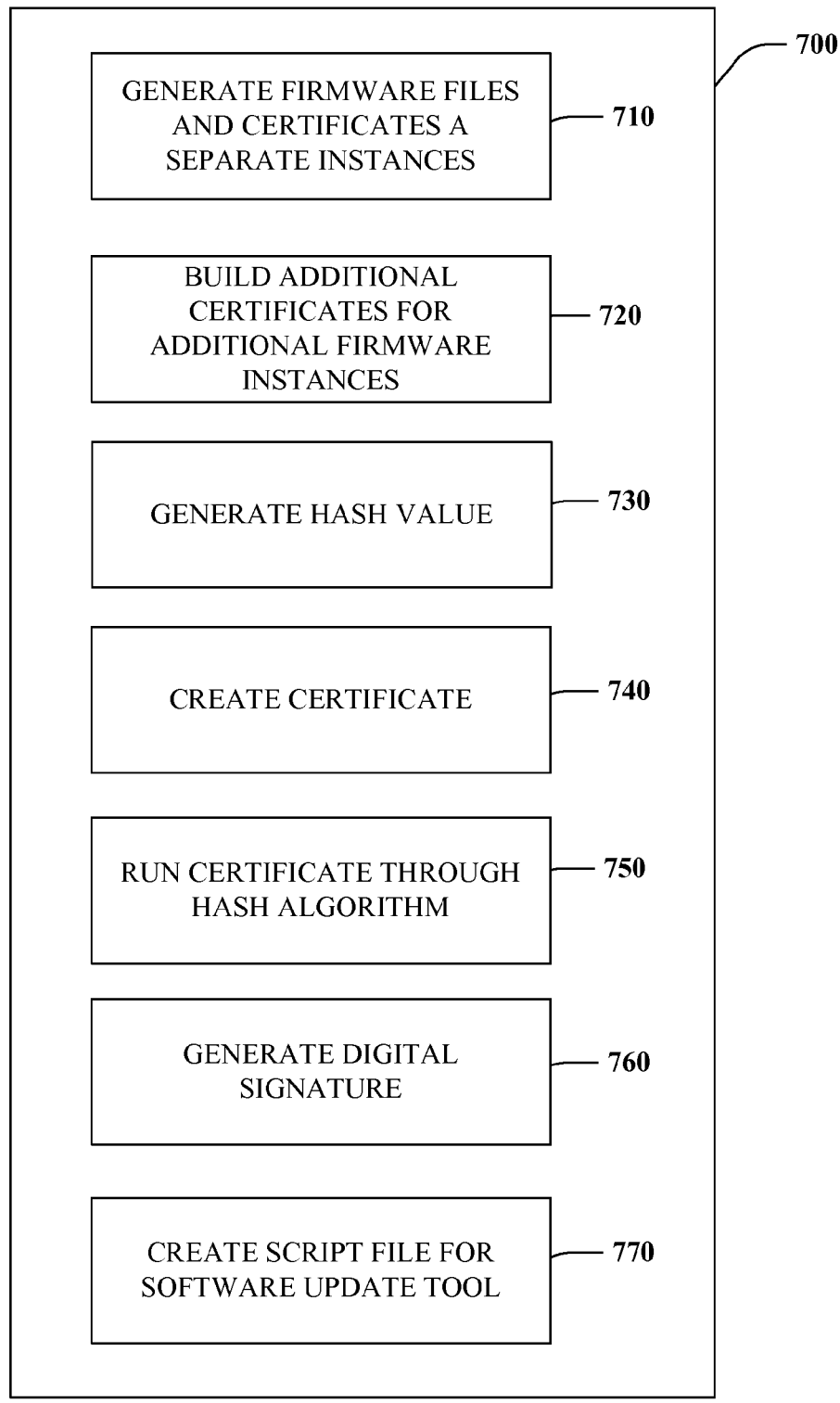
FIG. 7 illustrates an example build procedure for generating separate binary files and certificates.

FIG. 7 illustrates an example build procedure 700 for generating separate binary files and certificates. It is noted that the firmware build procedure can be specific to a module's build environment. It is not required that all modules follow the exact same build procedure. The following shows the basic steps in an example build procedure 700 in order to support firmware signing. At 710, the build procedure produces (at least) 2 files: one file for the firmware image and another for the certificate. Each file generally corresponds to an instance. Using separate instances makes it possible to allow module downgrading to previous (non-signed) firmware revisions. In general, each firmware binary corresponds to a firmware component (e.g., boot, runtime, file system, and so forth). Each firmware binary/certificate pair are then associated. Thus, each firmware binary/certificate pair can be associated via a defined mechanism such as file name or file identifier, for example.

At 720, some modules have more than one file instance for firmware. In this case, each firmware instance has a corresponding certificate. At 730, when built, the firmware image is run through the SHA-1 algorithm (or comparable type) to generate a hash value for the firmware image. At 740, the build procedure creates the certificate that includes:

The hash value for the firmware image

Information to identify the module type for which the firmware was built:

Vendor ID, Product Type, Product Code, target Hardware Revision (if any), firmware revision being built.

Modules that use a single firmware image for multiple product codes (same firmware, different hardware) should select a single product code for the purposes of the certificate.

At 750, the certificate (not including the Digital Signature field) is then run through the SHA-1 algorithm (or comparable type) to generate a hash value for the certificate. At 760, the digital signature is then created, per the algorithm described above and appended to the certificate. At 770, the build procedure then creates a script file for use with a software utility for updating modules.

Figure 8:
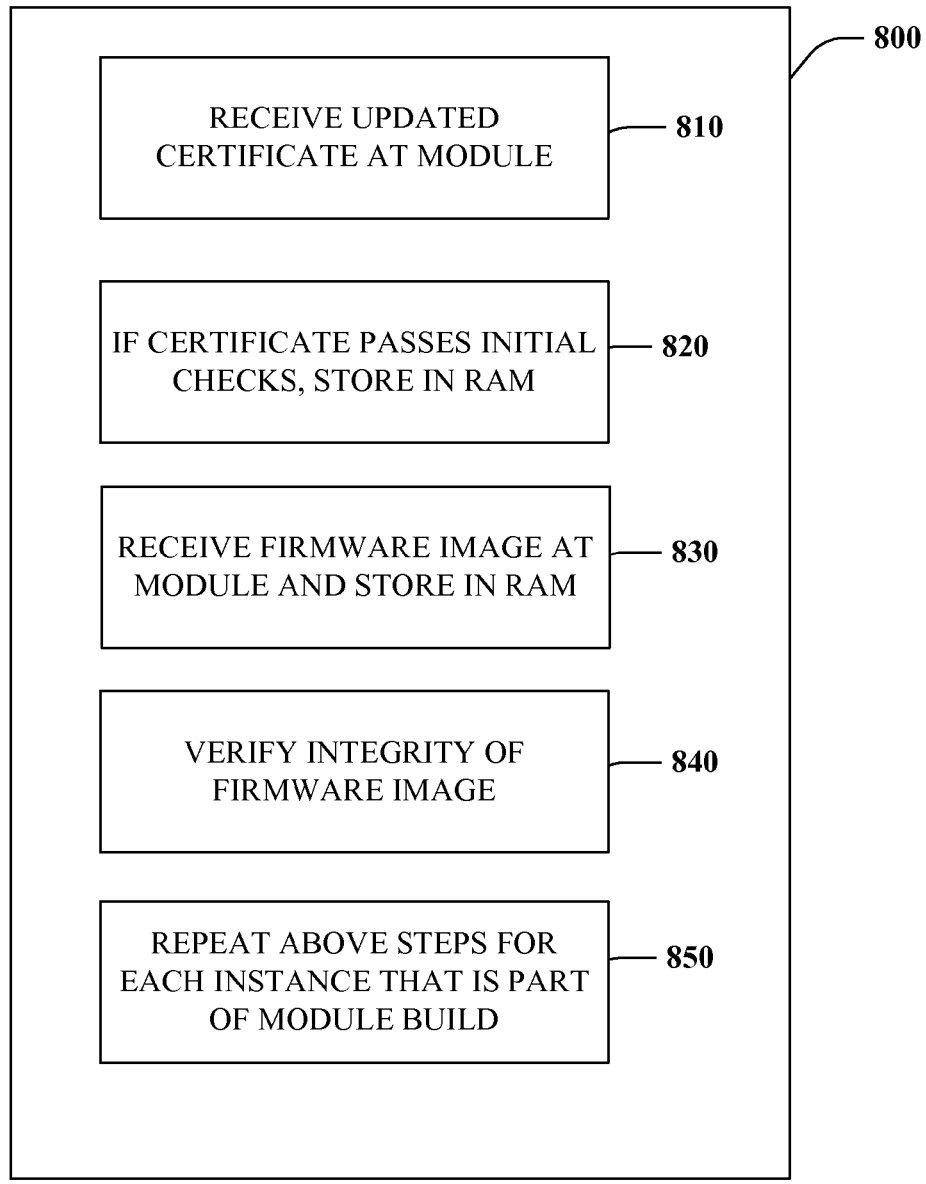
FIG. 8 illustrates an example firmware update procedure.

FIG. 8 illustrates an example firmware update procedure 800. The following describes the operation of an example firmware update procedure, assuming the module has sufficient RAM to hold the incoming firmware image. At 810, the module first receives the update certificate. The certificate should at least be minimally checked for the proper vendor id, product type, product code, and so forth. If the module has sufficient processing capability, the certificate signature should also be checked including:

Decrypt the signature using the RSA public key to obtain the original hash value.

Compute the hash value for the certificate (not including the signature field).

Compare the hash value to that which was in the signature. If the values do not compare, the firmware update is rejected.

If the module does not have sufficient processing power to perform the above steps, such that software utility would time out, then the verification of the certificate can be performed at the end of the update, before burning flash. At 820, if the certificate passes the initial checks, it is stored in RAM. At 830, the module next receives the firmware image, which is read into RAM. At 840, when the firmware image is received, the module performs the following to verify the integrity of the firmware image:

If not performed previously, decrypt the certificate signature, compute its hash value and compare to the original hash value in the signature.

Compute the hash value of the firmware image and compare to that which is stored in the certificate. If the values do not match, reject the update as invalid.

The firmware image can then be written to flash.

It is desirable to also write the certificate to flash, since it could potentially be used to verify firmware integrity at startup (for those modules with sufficient compute power).

At 850, the above steps (810-840) are performed for each instance that is part of the module's build.

It is noted that as used in this application, terms such as "component," "module," "system," and the like are intended to refer to a computer-related, electro-mechanical entity or both, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process or thread of execution and a component may be localized on one computer or distributed between two or more computers, industrial controllers, or modules communicating therewith.

The subject matter as described above includes various exemplary aspects. However, it should be appreciated that it is not possible to describe every conceivable component or methodology for purposes of describing these aspects. One of ordinary skill in the art may recognize that further combinations or permutations may be possible. Various methodologies or architectures may be employed to implement the subject invention, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:

receiving, by a first device, a signature aware firmware code, wherein the first device has a hardware revision;

verifying, by the first device via a boot code, a certificate associated with the signature aware firmware code, wherein the certificate includes a custom field defining a list of hardware revisions of the first device for which the signature aware firmware code is valid, wherein the verifying the certificate comprises verifying that the hardware revision of the first device is in the list of hardware revisions; and installing, by the first device via the boot code, on the first device the signature aware firmware code, wherein the boot code is configured for installation of signature aware firmware code and signature unaware firmware code to the first device.

2. The method of claim 1, further comprising:

receiving, by the first device via the boot code, a signature unaware firmware code;

verifying, by the first device via the boot code, that the signature unaware firmware code is received from a second device associated with a user that has physical access to the first device; and installing, by the first device via the boot code, on the first device the signature unaware firmware code.

3. The method of claim 2, wherein the verifying that the signature unaware firmware code is received from a second device associated with a user that has physical access to the first device further comprises employing, by the first device via the boot code, at least one feedback mechanism to ensure that the user has physical access to the first device.

4. The method of claim 1, further comprising:
receiving, by the first device via the boot code, a signature unaware firmware code;
verifying, by the first device via the boot code, that the signature unaware firmware code is received from a proxy module located remotely from the first device, where the proxy module has verified the signature unaware firmware code; and
installing, by the first device via the boot code, on the first device the signature unaware firmware code.

5. A system, comprising:
a first device that receives a signature aware firmware code, wherein the first device has a hardware revision; and
a boot code installed on the first device that:
verifies a certificate associated with the signature aware firmware code, wherein the certificate includes a custom field defining a list of hardware revisions of the first device for which the signature aware firmware code is valid, wherein the verifying the certificate comprises verifying that a hardware revision of the first device is in the list; and
installs on the first device the signature aware firmware code, wherein the boot code is configured for installation of signature aware firmware code and signature unaware firmware code to the first device.

6. The system of claim 5, further comprising wherein:
the first device receives a signature unaware firmware code; and
the boot code, prior to installing the signature unaware firmware code, verifies that the signature unaware firmware code is received from a second device associated with a user that has physical access to the first device, and installs on the first device the signature unaware firmware code.

7. The system of claim 6, wherein the boot code employs at least one feedback mechanism to ensure that the user has physical access to the first device.

8. The system of claim 5 further comprising wherein the first device receives a signature firmware code; and the boot code, prior to installing the signature unaware firmware code, verifies that the signature unaware firmware code is received from a proxy module located remotely from the first device, where the proxy module has verified the signature unaware firmware code and installs on the first device the signature unaware firmware code.

9. A non-transitory computer-readable medium having instructions stored thereon that, in response to execution, cause a first device to perform operations comprising:
receiving a signature aware firmware code;
verifying, by the first device via a boot code, a certificate associated with the signature aware firmware code, wherein the first device has a hardware revision and the certificate includes a custom field defining a list of hardware revisions of the first device for which the signature aware firmware code is valid, wherein the verifying the certificate comprises verifying that a hardware revision of the first device is in the list; and
installing, via the boot code, on the first device the signature aware firmware code, wherein the boot code is configure for installation of signature aware firmware code and signature unaware firmware code to the first device.

10. The non-transitory computer-readable medium of claim 9, the operations further comprising:
receiving, via the boot code, a signature unaware firmware code;
verifying, via the boot code, that the signature unaware firmware code is received from a second device associated with a user that has physical access to the first device; and
installing, via the boot code, on the first device the signature unaware firmware code.

11. The non-transitory computer-readable medium of claim 10, wherein the verifying that the signature unaware firmware code is received from a second device associated with a user that has physical access to the first device further comprises employing, via the boot code, at least one feedback mechanism to ensure that the user has physical access to the first device.

12. The non-transitory computer-readable medium of claim 9, the operations further comprising:
receiving, via the boot code, a signature unaware firmware code;
verifying, via the boot code, that the signature unaware firmware code is received from a proxy module located remotely from the first device, where the proxy module has verified the signature unaware firmware code; and
installing, via the boot code, on the first device the signature unaware firmware code.

* * * * *